United States Patent
Takahashi et al.

(10) Patent No.: US 10,847,786 B2
(45) Date of Patent: Nov. 24, 2020

(54) ALKALINE DRY BATTERY

(71) Applicant: Panasonic Intellectual Property Management Co., Ltd., Osaka (JP)

(72) Inventors: Yasufumi Takahashi, Hyogo (JP); Satoshi Fujiyoshi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 101 days.

(21) Appl. No.: 16/314,767

(22) PCT Filed: Jul. 18, 2017

(86) PCT No.: PCT/JP2017/025862
§ 371 (c)(1),
(2) Date: Jan. 2, 2019

(87) PCT Pub. No.: WO2018/066204
PCT Pub. Date: Apr. 12, 2018

(65) Prior Publication Data
US 2019/0157662 A1    May 23, 2019

(30) Foreign Application Priority Data

Oct. 3, 2016   (JP) .................................. 2016-196038

(51) Int. Cl.
*H01M 4/24*   (2006.01)
*H01M 4/62*   (2006.01)
(Continued)

(52) U.S. Cl.
CPC ............... *H01M 4/24* (2013.01); *H01M 2/16* (2013.01); *H01M 4/244* (2013.01); *H01M 4/42* (2013.01);
(Continued)

(58) Field of Classification Search
None
See application file for complete search history.

(56) References Cited

U.S. PATENT DOCUMENTS 3,281,278 A   10/1966   Schaefer
5,240,793 A    8/1993   Glaeser
(Continued)

FOREIGN PATENT DOCUMENTS

JP   49-119127 A   11/1974
JP   61-208753 A    9/1986
(Continued)

OTHER PUBLICATIONS

International Search Report dated Sep. 26, 2017, issued in counterpart International Application No. PCT/JP2017/025862 (2 pages).
(Continued)

*Primary Examiner* — Wyatt P McConnell
(74) *Attorney, Agent, or Firm* — Westerman, Hattori, Daniels & Adrian, LLP

(57) ABSTRACT

An alkaline dry battery includes a positive electrode, a gel negative electrode, a separator disposed between the positive electrode and the negative electrode, and an alkaline electrolyte solution contained in the positive electrode, the negative electrode, and the separator. The negative electrode contains a negative electrode active material containing zinc and particulate terephthalic acid. The terephthalic acid contained in the negative electrode has an average particle diameter of 25 to 210 μm.

5 Claims, 1 Drawing Sheet

(51) Int. Cl.
*H01M 6/04* (2006.01)
*H01M 4/42* (2006.01)
*H01M 2/16* (2006.01)
*H01M 6/06* (2006.01)
*H01M 4/02* (2006.01)

(52) U.S. Cl.
CPC .............. *H01M 4/62* (2013.01); *H01M 4/628* (2013.01); *H01M 6/04* (2013.01); *H01M 6/06* (2013.01); *H01M 2004/023* (2013.01)

(56) References Cited

U.S. PATENT DOCUMENTS

| | | | | |
|---|---|---|---|---|
| 2002/0182501 | A1* | 12/2002 | Phillips | H01M 10/24 429/231 |
| 2009/0263710 | A1* | 10/2009 | Kato | H01M 6/08 429/163 |
| 2015/0093650 | A1* | 4/2015 | Gallo | C08L 1/02 429/255 |

FOREIGN PATENT DOCUMENTS

| | | |
|---|---|---|
| JP | 2-194103 A | 7/1990 |
| JP | 5-135770 A | 6/1993 |
| JP | 2003-86163 A | 3/2003 |
| JP | 2010-86703 A | 4/2010 |
| WO | 2017/056491 A1 | 4/2017 |

OTHER PUBLICATIONS

Arakawa Masafumi, "An Introduction to Particle Size Measurement", Journal of the Society of Powder Technology, 1980, vol. 17, No. 6, pp. 299-307, with Partial English Translation, 13 pages.

* cited by examiner

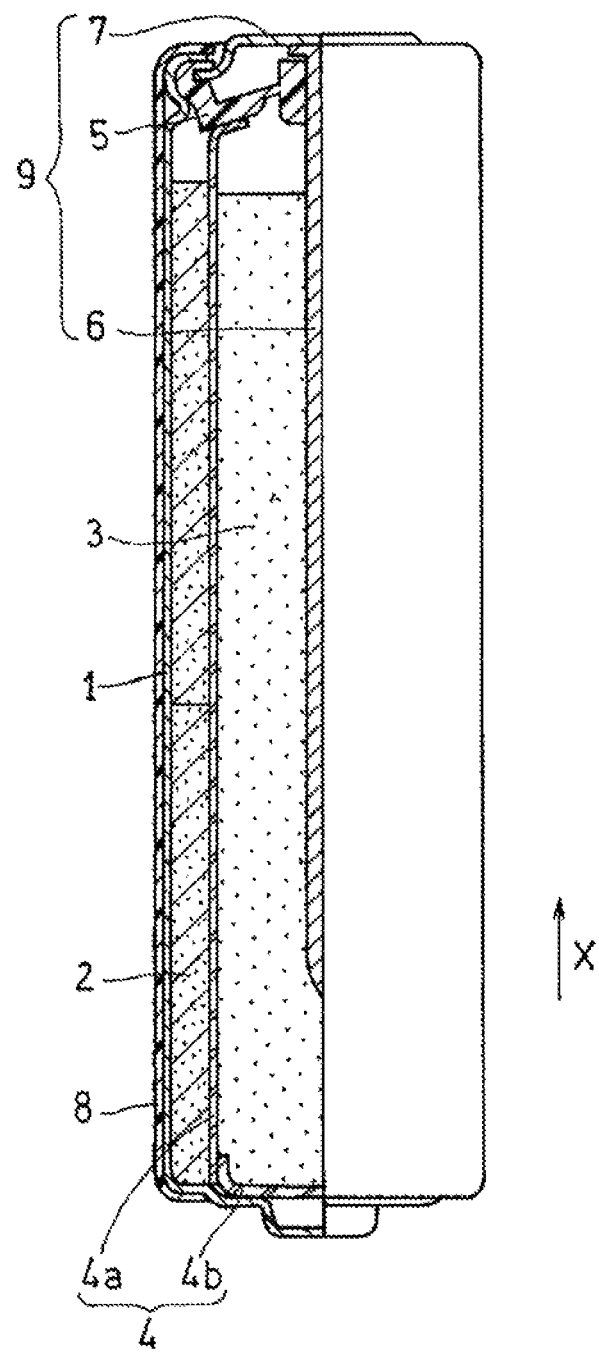

ALKALINE DRY BATTERY

TECHNICAL FIELD

The present invention relates to an alkaline dry battery including a gel negative electrode.

BACKGROUND ART

Compared to manganese dry batteries, alkaline dry batteries (alkaline-manganese dry batteries) have high capacity, output high current, and are thus widely used. An alkaline dry battery includes a positive electrode, a gel negative electrode, a separator disposed between the positive electrode and the negative electrode, and an alkaline electrolyte solution contained in the positive electrode, the negative electrode, and the separator. The negative electrode contains a negative electrode active material containing zinc. Such an alkaline dry battery has been variously studied.

For example, it is proposed that terephthalic acid be added to the negative electrode as an anti-corrosion agent for the negative electrode active material (see PTL 1). For terephthalic acid to exhibit an anti-corrosion agent effect, the surface of the negative electrode active material needs to be covered by very small terephthalic acid particles (e.g., particle diameter is 2 μm or less).

CITATION LIST

Patent Literature

PTL 1: Japanese Published Unexamined Patent Application No. 2-194103

SUMMARY OF INVENTION

In an alkaline dry battery including a gel negative electrode, in the case where the battery is subjected to a great impact or vibration when dropped or while being transported, the gel negative electrode may flow to (be scattered onto) the positive electrode and cause an internal short circuit, and the battery may generate heat. In particular, in an alkaline dry battery having an inside-out structure including a hollow cylindrical positive electrode and a gel negative electrode disposed in the hollow portion of the positive electrode, buckling of the separator may occur with flowing (scattering) of the negative electrode, and thus, the negative electrode is likely to leak to the positive electrode.

Because electronic devices in which an alkaline dry battery is used as a power source have high performance, alkaline dry batteries are desired to achieve higher capacity and higher output.

An object of the present disclosure is to achieve higher capacity and higher output of an alkaline dry battery including a gel negative electrode, to prevent or reduce an occurrence of an internal short circuit caused by flowing of the negative electrode to the positive electrode, and to prevent or reduce heat generation in the battery that occurs with the internal short circuit.

One aspect of the present disclosure relates to an alkaline dry battery including a positive electrode, a gel negative electrode, a separator disposed between the positive electrode and the negative electrode, and an alkaline electrolyte solution contained in the positive electrode, the negative electrode, and the separator. The negative electrode contains a negative electrode active material containing zinc and particulate terephthalic acid. The terephthalic acid has an average particle diameter of 25 to 210 μm.

According to the present disclosure, higher capacity and higher output of an alkaline dry battery including a gel negative electrode are achieved, and an occurrence of an internal short circuit caused by flowing of the negative electrode to the positive electrode and heat generation in the battery that occurs with the internal short circuit are prevented or reduced.

BRIEF DESCRIPTION OF DRAWINGS

FIG. 1 is a front view of an alkaline dry battery according to an embodiment of the present invention, with a part of the view of a cross section of the battery.

DESCRIPTION OF EMBODIMENTS

An alkaline dry battery according to an embodiment of the present invention includes a positive electrode, a gel negative electrode, a separator disposed between the positive electrode and the negative electrode, and an alkaline electrolyte solution contained in the positive electrode, the negative electrode, and the separator. The negative electrode contains a negative electrode active material containing zinc.

The negative electrode contains particulate terephthalic acid (para isomer). Unlike phthalic acid (ortho isomer) and isophthalic acid (meta isomer), terephthalic acid is unlikely to dissolve in the gel negative electrode. When the negative electrode contains particulate terephthalic acid, the surface of terephthalic acid particles dissolves slightly, and most of the particles remain without dissolving in the negative electrode. Thus, when the negative electrode contains particulate terephthalic acid, the negative electrode is whitely turbid. Such a phenomenon is not seen when the negative electrode contains phthalic acid or isophthalic acid.

When the terephthalic acid in the negative electrode has an average particle diameter of 25 to 210 μm, the negative electrode has appropriate viscosity and elasticity. Thus, even if the battery is subjected to a great impact or vibration when dropped or while being transported, flowing (scattering) of the negative electrode to the positive electrode is sufficiently prevented or reduced. As a result, the occurrence of an internal short circuit and heat generation in the battery that occurs with the internal short circuit are prevented. In an alkaline dry battery having an inside-out structure, buckling of the separator that occurs with flowing (scattering) of the negative electrode is prevented or reduced, and thus, leakage of the negative electrode to the positive electrode is sufficiently prevented or reduced.

The above white turbidity of the negative electrode and an effect of preventing or reducing flowing of the negative electrode are unlikely to be seen when the terephthalic acid in the negative electrode has an average particle diameter of 20 μm or less.

When the terephthalic acid in the negative electrode has an average particle diameter of 25 to 210 μm, discharge performance is improved. In particular, high-rate discharge performance is improved, and higher capacity and higher output are achieved. Terephthalic acid having the above specific average particle diameter is a good dispersant in the gel negative electrode. In other words, dispersing the above terephthalic acid in the gel negative electrode prevents or reduces agglomeration of the particulate negative electrode active material and agglomeration of a gelling agent. When the negative electrode active material and the gelling agent are uniformly mixed together in the gel negative electrode, non-uniform discharge is prevented or reduced, and thus, discharge performance is improved.

Furthermore, the gel negative electrode is sufficiently homogenized, and thus, reliability of the effect of preventing or reducing flowing of the negative electrode is improved.

If the terephthalic acid in the negative electrode has an average particle diameter of less than 25 µm, terephthalic acid does not sufficiently exhibit an effect of improving dispersibility of the negative electrode. Furthermore, the negative electrode active material is likely to be covered with small terephthalic acid particles, thereby decreasing a surface area (reactive surface area) of the negative electrode active material that is in contact with the electrolyte solution. Thus, discharge performance is not improved.

On the other hand, if the terephthalic acid in the negative electrode has an average particle diameter of more than 210 µm, the negative electrode active material and the gelling agent are likely to be degraded when they are in contact with the large terephthalic acid particles, since the large terephthalic acid particles exhibit a strong rupture force. Furthermore, the terephthalic acid does not sufficiently exhibit the effect of improving dispersibility of the negative electrode. Thus, discharge performance is not improved.

To further improve the effect of preventing or reducing flowing of the negative electrode and the effect of improving discharge performance, the terephthalic acid in the negative electrode preferably has an average particle diameter of 100 to 210 µm.

The average particle diameter of the terephthalic acid in the negative electrode is determined, for example, by the following method.

First, the battery is disassembled to obtain the gel negative electrode. Then, the gel negative electrode is centrifuged to remove the negative electrode active material from the negative electrode, and a mixture of the gelling agent and terephthalic acid particles is obtained. The obtained mixture is dried and thereafter examined under a light microscope, and 10 terephthalic acid particles are randomly selected. Then, the particle diameter of each particle is measured. The two highest measurements and the two lowest measurements are omitted. The average of the remaining six measurements is determined as the average particle diameter of the terephthalic acid in the negative electrode.

When a gel electrolyte solution (a mixture of the electrolyte solution and the gelling agent) contained in the negative electrode contains terephthalic acid having an average particle diameter of 25 to 210 µm, the gel electrolyte solution is whitely turbid. At this time, the transmittance of the gel electrolyte solution is 1% or less.

The transmittance of the above gel electrolyte solution is determined by the following method. First, the battery is disassembled to obtain the negative electrode. Then, the negative electrode is centrifuged to separate the negative electrode into a transparent upper layer containing the gel electrolyte solution, a whitely turbid middle layer containing the gel electrolyte solution and the terephthalic acid particles, and a lower layer containing the negative electrode active material. Then, the transmittance of the middle layer is determined as the transmittance of the gel electrolyte solution by absorption spectrophotometry.

The amount of terephthalic acid in the negative electrode is preferably 0.01 to 0.5 parts by mass relative to 100 parts by mass of the negative electrode active material. When the amount of terephthalic acid in the negative electrode is within the above range, the effect of preventing or reducing flowing of the negative electrode and the effect of improving discharge performance are further improved.

When the amount of terephthalic acid in the negative electrode is 0.5 parts by mass or less relative to 100 parts by mass of the negative electrode active material, the negative electrode has good elasticity and good viscosity. Thus, ease of pouring the negative electrode into the hollow portion of the positive electrode is improved.

As an additive, 0.1 to 1.0 parts by mass of a potassium halide is preferably contained in the negative electrode relative to 100 parts by mass of the negative electrode active material. When the negative electrode contains terephthalic acid having the specific average particle diameter and the specific amount of potassium halide in combination, the effect of improving dispersibility of the negative electrode is further improved, and thus, discharge performance is further improved, without degrading the effect of preventing or reducing flowing of the negative electrode, the effect being exhibited by the terephthalic acid. At least one of KF and KBr is preferably used as the potassium halide.

The amount of potassium halide in the negative electrode is more preferably 0.1 to 0.5 parts by mass relative to 100 parts by mass of the negative electrode active material.

The separator preferably contains 50 to 70 mass % of polyvinyl alcohol. Polyvinyl alcohol is contained, for example, in fiber (nonwoven fabric) or a microporous film that forms the separator.

When the amount of polyvinyl alcohol in the separator is within the above range, the strength of the separator is sufficiently improved. Thus, leakage of the negative electrode to the positive electrode is further prevented or reduced. In particular, in an alkaline dry battery having an inside-out structure, leakage of the negative electrode to the positive electrode caused by buckling of the separator is further prevented or reduced.

When the amount of polyvinyl alcohol in the separator is within the above range, the liquid-absorption rate of the separator is sufficiently improved. Thus, high-rate discharge performance is further improved.

In an alkaline dry battery having an inside-out structure, the separator preferably has a thickness of 220 to 390 µm.

In the present description, the thickness of a separator refers to the thickness of a separator swollen with an electrolyte solution. When one sheet is wound a plurality of times or when a plurality of sheets are layered on each other to form a separator, the thickness of the separator refers to the total thickness of the wound sheet (or layered sheets). The total thickness is the sum of the thickness of the wound sheet or the layered sheets. When one sheet is wound once or a plurality of times to form a cylindrical separator, in the case where one end portion of the sheet, at which winding starts, and the other end portion, at which winding ends, are layered on each other to improve the strength of the separator, the thickness of the separator refers to the thickness of a portion other than the above layered portion.

When the separator has a thickness of 220 to 390 µm, the strength of the separator is sufficiently obtained. Thus, leakage of the negative electrode to the positive electrode caused by buckling of the separator is further prevented or reduced. Furthermore, the volume of the hollow portion of the positive electrode (negative electrode capacity), which is to be filled with the negative electrode, is sufficiently obtained, and the internal resistance of the battery is sufficiently decreased. Thus, discharge performance is further improved. The separator more preferably has a thickness of 220 to 260 µm.

Examples of the alkaline dry battery according to an embodiment of the present invention include cylindrical batteries and coin batteries.

Hereinafter, an alkaline dry battery according to the present embodiments will be described in detail with reference to the drawing. The present invention is not limited to the following embodiments. Modifications of the present invention are possible in a range of the scope in which the advantageous effect of the present invention is exhibited. Furthermore, combinations with other embodiments are possible.

FIG. 1 is a front view of the alkaline dry battery according to an embodiment of the present invention, with the lateral half of the view of a cross section of the battery. FIG. 1 is an example of a hollow cylindrical battery having an inside-out structure. As shown in FIG. 1, the alkaline dry battery includes a hollow cylindrical positive electrode 2, a negative electrode 3 disposed in the hollow portion of the positive electrode 2, a separator 4 disposed therebetween, and an alkaline electrolyte solution (not shown). These are accommodated in a closed-end cylindrical battery case 1, which also serves as a positive electrode terminal.

The positive electrode 2 is in contact with the inner wall of the battery case 1. The positive electrode 2 contains manganese dioxide and the alkaline electrolyte solution.

The hollow portion of the positive electrode 2 is filled with the gel negative electrode 3 with the separator 4 disposed therebetween. The negative electrode 3 typically contains the alkaline electrolyte solution and a gelling agent in addition to terephthalic acid and a negative electrode active material containing zinc.

The separator 4 has a closed-end cylindrical shape and contains the electrolyte solution. The separator 4 is formed of a cylindrical separator 4a and a bottom insulator 4b. The separator 4a is disposed along the inner surface of the hollow portion of the positive electrode 2 and separates the positive electrode 2 and the negative electrode 3 from each other. Thus, the separator disposed between the positive electrode and the negative electrode refers to the cylindrical separator 4a. The bottom insulator 4b is disposed at the bottom portion of the hollow portion of the positive electrode 2 and separates the negative electrode 3 and the battery case 1 from each other.

The opening portion of the battery case 1 is sealed by a sealing unit 9. The sealing unit 9 is formed of a gasket 5, a negative electrode terminal plate 7, which also serves as the negative electrode terminal, and a negative electrode current collector 6. The negative electrode current collector 6 is inserted in the negative electrode 3. The negative electrode current collector 6 has a nail-like structure including a head portion and a body portion. The body portion is inserted in a through hole in the center cylinder of the gasket 5. The head portion of the negative electrode current collector 6 is welded to a flat portion in the center portion of the negative electrode terminal plate 7. The open edge of the battery case 1 is crimped to the flange portion in the peripheral portion of the negative electrode terminal plate 7 with the peripheral end portion of the gasket 5 disposed between the open edge and the flange portion. The outer surface of the battery case 1 is covered with an outer label 8.

The negative electrode 3 contains terephthalic acid particles having an average particle diameter of 25 to 210 μm. This provides appropriate viscosity and elasticity to the negative electrode 3, and flowing of the negative electrode 3 is sufficiently prevented or reduced. Thus, even if the battery is subjected to an impact or vibration when dropped or while being transported, the negative electrode 3 is unlikely to flow to (be scattered onto) the gasket 5. Accordingly, leakage of the negative electrode 3 to the positive electrode 2 that is caused by buckling of the separator 4a (the end portion near the gasket 5) that occurs with flowing (scattering) of the negative electrode 3 to the gasket 5 is sufficiently prevented or reduced. As a result, the occurrence of an internal short circuit caused by the leakage of the negative electrode 3 to the positive electrode 2 and heat generation in the battery that occurs with the internal short circuit are prevented. When the terephthalic acid contained in the negative electrode 3 has an average particle diameter of 25 to 210 μm, good discharge performance (particularly, high-rate discharge performance) is obtained.

Hereinafter, an alkaline dry battery will be described in detail.

(Negative Electrode)

Examples of the negative electrode active material include zinc and a zinc alloy. From the viewpoint of corrosion resistance, the zinc alloy may contain at least one selected from a group consisting of indium, bismuth, and aluminum. In the zinc alloy, the amount of indium is, for example, 0.01 to 0.1 mass %, and the amount of bismuth is, for example, 0.003 to 0.02 mass %. The amount of aluminum in the zinc alloy is, for example, 0.001 to 0.03 mass %. From the viewpoint of corrosion resistance, the proportion of elements other than zinc in the zinc alloy is preferably 0.025 to 0.08 mass %.

The negative electrode active material is typically used in a powder state. From the viewpoint of diffusivity of the alkaline electrolyte solution in the negative electrode and ease of pouring the negative electrode, the negative electrode active material powder has an average particle diameter (D50) of, for example, 100 to 200 μm, preferably 110 to 160 μm. In the present description, the term "average particle diameter (D50)" refers to the median diameter of a volume-based particle diameter distribution. The average particle diameter is determined, for example, by using a laser diffraction/scattering particle size distribution analyzer.

The negative electrode is obtained, for example, by mixing negative electrode active material particles containing zinc, terephthalic acid particles, a gelling agent, and an alkaline electrolyte solution. A terephthalic acid powder added to the negative electrode preferably has an average particle diameter (D50) of 25 to 210 μm, more preferably 100 to 210 μm. In this case, if the battery is subjected to an impact or vibration when dropped or while being transported, leakage of the negative electrode to the positive electrode that is caused by buckling of the separator that occurs with flowing of the negative electrode is prevented or reduced, and discharge performance is improved.

The average particle diameter (D50) P1 of the negative electrode active material powder used during production of the negative electrode and the average particle diameter (D50) P2 of the terephthalic acid powder used during production of the negative electrode preferably satisfy the following formula:

$$0.5 \leq P1/P2 \leq 5.0$$

When P1/P2 is within the above range, the effect of preventing or reducing flowing of the negative electrode and the effect of improving discharge performance are further improved. The value of P1/P2 is more preferably 0.6 to 1.3.

A known gelling agent used in the alkaline dry battery field is used as the gelling agent without a particular limitation. For example, a water-absorbent polymer may be used. Examples of such a gelling agent include polyacrylic acid and sodium polyacrylate.

The amount of gelling agent added is, for example, 0.5 to 2.5 parts by mass relative to 100 parts by mass of the negative electrode active material.

In the negative electrode, for viscosity adjustment or the like, a surfactant, such as a polyoxyalkylene group-containing compound or a phosphate, may be used. Among such compounds, preferable examples include phosphates and alkali metal salts thereof. From the viewpoint of further uniformly dispersing a surfactant in the negative electrode, it is preferable that the surfactant be previously added to an alkaline electrolyte solution that is used during production of the negative electrode.

To improve corrosion resistance, a compound containing a metal, such as indium or bismuth, that has a high hydrogen overvoltage may be appropriately added to the negative electrode. To prevent or reduce the growth of dendrites of, for example, zinc, a trace amount of silicate compound, such as silicic acid or the potassium salt thereof, may be appropriately added to the negative electrode.

(Negative Electrode Current Collector)

Examples of the material of the negative electrode current collector to be inserted into the gel negative electrode include metals and alloys. The negative electrode current collector preferably contains copper. For example, the negative electrode current collector may be made of an alloy, such as brass, which contains copper and zinc. The negative electrode current collector may be subjected to plating treatment, such as tin plating, if necessary.

(Positive Electrode)

The positive electrode typically contains an electrically conductive agent and an alkaline electrolyte solution in addition to manganese dioxide that is a positive electrode active material. The positive electrode may further contain a binder, if necessary.

It is preferable that electrolytic manganese dioxide be used as the manganese dioxide. The crystal structures of manganese dioxide include an α-type, β-type, γ-type, δ-type, ε-type, η-type, λ-type, and ramsdellite-type structures.

Manganese dioxide is used in a powder state. From the viewpoint that diffusivity of the electrolyte solution in the positive electrode and ease of pouring the positive electrode are easily obtained, the average particle diameter (D50) of manganese dioxide is, for example, 25 to 60 μm.

From the viewpoint of formability and prevention or reduction of positive electrode expansion, the BET specific surface area of manganese dioxide may be, for example, within the range of 20 to 50 $m^2/g$. The BET specific surface area is determined by measuring and calculating a surface area by using the BET formula, which is the formula based on the multi-molecular layer adsorption theory. The BET specific surface area may be measured, for example, by using a specific surface area analyzer using a nitrogen adsorption method.

Examples of the electrically conductive agent include electrically conductive carbon materials, such as graphite, in addition to carbon black, such as acetylene black. For example, natural graphite or synthetic graphite can be used as the graphite. The electrically conductive agent may be fiber but is preferably powder. The electrically conductive agent has an average particle diameter (D50) of, for example, 3 to 20 μm.

The amount of electrically conductive agent in the positive electrode is, for example, 3 to 10 parts by mass and preferably 5 to 9 parts by mass relative to 100 parts by mass of manganese dioxide.

The positive electrode is obtained, for example, by pressure-molding a positive electrode mixture containing a positive electrode active material, an electrically conductive agent, an alkaline electrolyte solution, and, if necessary, a binder into a pellet. The positive electrode mixture may be pressure-molded into a pellet after being made into flakes or granules and, if necessary, classified.

The pellet is accommodated in a battery case, and thereafter, a secondary pressure is applied to the pellet, by using a predetermined instrument, such that the pellet adheres to the inner wall of the battery case.

(Separator)

Examples of the material of the separator include cellulose and polyvinyl alcohol. The separator may be nonwoven fabric in which the main constituent is fiber of the above material or a microporous film, such as a cellophane film or a polyolefin-based film. Nonwoven fabric and a microporous film may be used in combination with each other.

Nonwoven fabric is preferably used as the separator. From the viewpoint of improving the separator strength, the nonwoven fabric preferably contains polyvinyl alcohol fiber. Such nonwoven fabric is obtained, for example, by mixing together polyvinyl alcohol fiber and another fiber other than polyvinyl alcohol fiber. Specific examples include nonwoven fabric in which cellulose fiber and polyvinyl alcohol fiber are mixed together as the main constituents and nonwoven fabric in which rayon fiber and polyvinyl alcohol fiber are mixed together as the main constituents. From the viewpoint of preventing or reducing leakage of the negative electrode to the positive electrode that is caused by buckling of the separator and from the viewpoint of improving discharge performance, the amount of polyvinyl alcohol fiber in the nonwoven fabric is preferably 50 to 70 mass %.

In FIG. 1, the closed-end cylindrical separator 4 is formed of the cylindrical separator 4a and the bottom insulator 4b. The closed-end cylindrical separator is not limited to such a structure and may be a known-shape separator used in the alkaline dry battery field. The separator may be formed of one sheet or a plurality of sheets layered on each other if the sheet used as the separator is thin. The cylindrical separator may be formed of a thin sheet wound a plurality of times.

(Alkaline Electrolyte Solution)

The alkaline electrolyte solution is contained in the positive electrode, the negative electrode, and the separator. For example, an alkaline aqueous solution containing potassium hydroxide is used as the alkaline electrolyte solution. The concentration of potassium hydroxide in the alkaline electrolyte solution is preferably 30 to 50 mass %. The alkaline aqueous solution may further contain zinc oxide. The concentration of zinc oxide in the alkaline electrolyte solution is, for example, 1 to 5 mass %.

(Battery Case)

For example, a closed-end cylindrical metal case is used as the battery case. For the metal case, a nickel-plated steel sheet may be used. To improve adhesion between the positive electrode and the battery case, a battery case obtained by covering the inner surface of a metal case with a carbon coating is preferably used.

EXAMPLES

Hereinafter, the present invention will be specifically described in accordance with Examples and Comparative Examples. The present invention is not limited to the following Examples.

Example 1

The AA-size cylindrical alkaline dry battery (LR6) illustrated in FIG. 1 was produced in accordance with the following steps (1) to (3).

(1) Production of Positive Electrode

A graphite powder (average particle diameter (D50) 8 µm) that was the electrically conductive agent was added to an electrolytic manganese dioxide powder (average particle diameter (D50) 35 µm) that was the positive electrode active material to obtain a mixture. The mass ratio of the electrolytic manganese dioxide powder to the graphite powder was set to 92.4:7.6. The electrolytic manganese dioxide powder had a specific surface area of 41 m$^2$/g. After an electrolyte solution was added to the mixture and stirred well, compression-molding was performed to make the resulting mixture into flakes to obtain a positive electrode mixture. The mass ratio of the mixture to the electrolyte solution was set to 100:1.5. An alkaline aqueous solution containing potassium hydroxide (concentration, 35 mass %) and zinc oxide (concentration, 2 mass %) was used as the electrolyte solution.

The flake positive electrode mixture was pulverized into granules, and the granules were classified by using a sieve. Eleven grams of 10 to 100 mesh granules were pressure-molded to produce two positive electrode pellets having a predetermined hollow cylindrical shape with an outer diameter of 13.65 mm.

(2) Production of Negative Electrode

A zinc alloy powder (average particle diameter (D50) 130 µm) that was the negative electrode active material, a terephthalic acid powder (average particle diameter (D50) 26 µm), the above electrolyte solution, and a gelling agent were mixed together to obtain the gel negative electrode 3. A zinc alloy containing 0.02 mass % of indium, 0.01 mass % of bismuth, and 0.005 mass % of aluminum was used as the zinc alloy. A mixture of crosslinked and branched polyacrylic acid and highly-crosslinked chain sodium polyacrylate was used as the gelling agent. The negative electrode active material/electrolyte solution/gelling agent mass ratio was set to 100:50:1. Relative to 100 parts by mass of the negative electrode active material, 0.2 parts by mass of terephthalic acid was used.

(3) Assembly of Alkaline Battery

To obtain the battery case 1, varniphite, manufactured by Nippon Graphite Industries, Co., Ltd., was applied to the inner surface of a closed-end cylindrical battery case (outer diameter 13.80 mm, wall thickness of the cylindrical portion 0.15 mm, height 50.3 mm) made of a nickel-plated steel sheet to form a carbon coating having a thickness of about 10 µm. After the two positive electrode pellets were inserted into the battery case 1 so as to be longitudinally stacked, pressure was applied to form the positive electrode 2, which adheres to the inner wall of the battery case 1. After the closed-end cylindrical separator 4 was disposed inside the positive electrode 2, the above electrolyte solution was injected to impregnate the separator 4 therewith. The electrolyte solution was left for a predetermined time in this state to permeate from the separator 4 to the positive electrode 2. Then, the inside of the separator 4 was filled with 6 g of the gel negative electrode 3.

The separator 4 was formed of the cylindrical separator 4*a* and the bottom insulator 4*b*. Nonwoven fabric sheets (basis weight 28 g/m$^2$) in which rayon fiber and polyvinyl alcohol fiber were mixed together as the main constituents at a mass ratio of 1:1 were used as the cylindrical separator 4*a* and the bottom insulator 4*b*. The nonwoven fabric sheet used as the bottom insulator 4*b* had a thickness of 0.27 mm.

The separator 4*a* (the thickness before becoming swollen, 206 µm) was formed of a nonwoven fabric sheet having a thickness of 103 µm wound twice. At this time, a portion where one end portion of the nonwoven fabric sheet, at which winding started, and the other end portion of the nonwoven fabric sheet, at which winding ended, were layered on each other was provided. In a cross section perpendicular to the axial direction (X direction in FIG. 1) of the positive electrode of the separator, the length of the layered portion was set to 3 mm.

The negative electrode current collector 6 was obtained by pressing typical brass (Cu content: about 65 mass %, Zn content: about 35 mass %) into a nail shape, and thereafter, the surface was plated with tin. The diameter of the body portion of the negative electrode current collector 6 was set to 1.15 mm. The head portion of the negative electrode current collector 6 was electrically welded to the negative electrode terminal plate 7 made of a nickel-plated steel sheet. Then, the body portion of the negative electrode current collector 6 was inserted with pressure into the through hole in the center of the gasket 5, in which polyamide 6 and polyamide 12 are contained as the main constituents. As described above, the sealing unit 9 formed of the gasket 5, the negative electrode terminal plate 7, and the negative electrode current collector 6 was produced.

The sealing unit 9 was then disposed at the opening of the battery case 1. At this time, the body portion of the negative electrode current collector 6 was inserted into the negative electrode 3. The open edge of the battery case 1 was crimped to the peripheral portion of the negative electrode terminal plate 7 with the gasket 5 disposed therebetween to seal the opening of the battery case 1. The outer surface of the battery case 1 was covered with the outer label 8. As described above, the alkaline dry battery was produced.

Examples 2

An alkaline dry battery was produced in the same manner as in Example 1, except that the average particle diameter of the terephthalic acid in the negative electrode was changed to the value in Table 1.

Comparative Example 1

An alkaline dry battery was produced in the same manner as in Example 1, except that terephthalic acid was not used during production of the negative electrode.

Comparative Examples 2 to 4

An alkaline dry battery was produced in the same manner as in Example 1, except that the average particle diameter of the terephthalic acid in the negative electrode was changed to the value in Table 1.

Comparative Example 5

An alkaline dry battery was produced in the same manner as in Example 1, except that a phthalic acid (ortho isomer) powder was used instead of the terephthalic acid (para isomer) powder during production of the negative electrode.

Comparative Example 6

An alkaline dry battery was produced in the same manner as in Example 1, except that an isophthalic acid (meta isomer) powder was used instead of the terephthalic acid (para isomer) powder during production of the negative electrode.

[Evaluation]

The obtained alkaline dry batteries were evaluated as follows.

(i) Safety Evaluation

Twenty batteries in each of Examples and Comparative Examples were provided. Two batteries in each of examples were disposed in series and fixed to each other by using a tape. The two batteries were dropped from a height of 1 m to a concrete floor with the negative electrode (the negative electrode terminal plate 7 in FIG. 1) facing downward. The step of dropping was repeated three times. At this time, the number of batteries generating heat to have a temperature of 40° C. or higher was counted, and the percentage of batteries generating heat was calculated.

(ii) Evaluation of High-Rate Pulse Discharge Performance

Under an environment of 20±2° C., a pulse discharge in which a discharge at 1.5 W for two seconds and a discharge at 0.65 W for 28 seconds were alternately repeated 10 times was performed, and the pulse discharge was followed by a pause of 55 minutes. This step was repeatedly performed until the closed-circuit voltage of the battery reached 1.05 V. At this time, the time that elapsed until the closed-circuit voltage of the battery reached 1.05 V was measured and expressed as an index relative to the discharge time in Comparative Example 1, when the discharge time in Comparative Example 1 was assumed to be 100.

(iii) Measurement of Average Particle Diameter of Terephthalic Acid in Negative Electrode After the battery was disassembled to obtain the gel negative electrode, the gel negative electrode was centrifuged to remove the negative electrode active material from the negative electrode, and a mixture of a gelling agent and terephthalic acid particles was obtained. The obtained mixture was dried and thereafter examined under a light microscope, and 10 terephthalic acid particles were randomly selected. Then, the particle diameter of each particle was measured. The two highest measurements and two lowest measurements were removed. The average of the remaining six measurements was determined as the average particle diameter of the terephthalic acid in the negative electrode.

(iv) Measurement of Thickness of Separator (After Becoming Swollen)

The image of the cross section (a cross section perpendicular to the X direction in FIG. 1) at a point separated by 20 mm in the axial direction (X direction in FIG. 1) of the battery from the surface of the positive electrode terminal was examined by using a CT scanner to measure the distance between the positive electrode and the negative electrode (length in the radial direction). The distance was regarded as the thickness of the separator 4a (swollen with the electrolyte solution). First, measurement was performed at an arbitrary point (not in a portion where one end portion, at which winding started, and the other end portion, at which winding ended, were layered on each other) in a portion where the cylindrical separator 4a was disposed between the positive electrode and the negative electrode. The measurement was performed in the same manner at points (other three points not in a portion where one end portion, at which winding started, and the other end portion, at which winding ended, were layered on each other) that were each obtained when the battery was rotated at 90° at a time around the axis of the battery. Among the four measurements, the average of two measurements other than the highest value and the lowest value was determined.

Evaluation results are summarized in Table 1.

TABLE 1

|  | Negative electrode | | | Evaluation | |
|---|---|---|---|---|---|
|  | Average particle diameter of terephthalic Acid (μm) | Amount of terephthalic acid (parts by mass) | White turbidity | Percentage of batteries generating heat (%) | High-rate discharge performance (index) |
| Comparative Example 1 | — | 0 | absent | 50 | 100 |
| Comparative Example 2 | 2 | 0.2 | absent | 50 | 100 |
| Comparative Example 3 | 24 | 0.2 | present | 0 | 100 |
| Example 1 | 26 | 0.2 | present | 0 | 103 |
| Example 2 | 100 | 0.2 | present | 0 | 106 |
| Example 3 | 130 | 0.2 | present | 0 | 116 |
| Example 4 | 204 | 0.2 | present | 0 | 106 |
| Comparative Example 4 | 217 | 0.2 | present | 0 | 100 |
| Comparative Example 5 | (dissolved) | 0.2 (phthalic acid) | absent | 100 | 96 |
| Comparative Example 6 | (dissolved) | 0.2 (isophthalic acid) | absent | 100 | 92 |

The average particle diameter of the terephthalic acid in the negative electrode was about 26 μm in Example 1, about 100 μm in Example 2, about 130 μm in Example 3, and about 204 μm in Example 4. The average particle diameter of the terephthalic acid in the negative electrode was about 2 μm in Comparative Example 2, about 24 μm in Comparative Example 3, and about 217 μm in Comparative Example 4.

The thickness of the separator (after becoming swollen) in Examples 1 to 4 and Comparative Examples 1 to 6 was about 260 μm.

In Examples 1 to 4 and Comparative Examples 3 and 4, the negative electrode contains terephthalic acid particles having an average particle diameter of more than 20 μm. Thus, the negative electrode was whitely turbid. In Comparative Examples 5 and 6, during production of the negative electrode, phthalic acid or isophthalic acid dissolved in the negative electrode. Thus, the negative electrode was not whitely turbid and was colorless. In Comparative Example 2, terephthalic acid particles contained in the negative electrode were very small. Thus, the negative electrode was not whitely turbid.

In Examples 1 to 4, the negative electrode contains the terephthalic acid having the specific average particle diameter, thereby preventing or reducing flowing of the negative electrode. Thus, there were no batteries generating heat.

In Examples 1 to 4, high-rate discharge performance was improved. The reason is probably that the negative electrode contains the terephthalic acid having the specific average particle diameter and thus, the negative electrode active material and the gelling agent were uniformly mixed together in the negative electrode, thereby preventing or reducing non-uniform discharge. In Examples 2 to 4, in which the terephthalic acid in the negative electrode had an average particle diameter of 100 to 210 μm, excellent high-rate discharge performance was obtained.

In Comparative Example 1, the negative electrode did not contain the terephthalic acid having the specific average particle diameter, and thus, flowing of the negative electrode was neither prevented nor reduced. Accordingly, there were batteries generating heat. Furthermore, in Comparative Example 1, the negative electrode did not contain the terephthalic acid having the specific average particle diameter, and thus, discharge performance was not improved.

In Comparative Example 2, terephthalic acid particles were very small. Thus, the effect of preventing or reducing flowing of the negative electrode was not exhibited, and there were batteries generating heat.

In Comparative Examples 2 and 3, discharge performance was not improved. The reason is probably that the terephthalic acid particles were small and thus, the effect of improving dispersibility of the negative electrode was not sufficiently exhibited. The reason is also probably that the negative electrode active material was largely covered by the small terephthalic acid particles, thereby decreasing a surface area (reactive surface area) of the negative electrode active material that was in contact with the electrolyte solution.

In Comparative Example 4, the negative electrode active material and the gelling agent were degraded by contact with large terephthalic acid particles. Thus, the discharge performance was not improved.

In Comparative Examples 5 and 6, in which phthalic acid or isophthalic acid was added to the negative electrode, flowing of the negative electrode was neither prevented nor reduced. Thus, there were batteries generating heat. Furthermore, in Comparative Examples 5 and 6, discharge performance was lower than that in Comparative Example 1.

Here, evaluation results of an anti-corrosion effect of terephthalic acid on the negative electrode active material will be described. A battery in Comparative Example 1 to which terephthalic acid was not added, a battery in Comparative Example 2 to which terephthalic acid having an average particle diameter of 2 μm was added, and a battery in Example 2 to which terephthalic acid having an average particle diameter of 100 μm was added were stored for 28 days at 60° C. Then, the batteries were opened by a water displacement method, and the amount of gas collected was measured. The amount of gas was 0.65 ml in the battery in Comparative Example 1, 0.55 ml in the battery in Comparative Example 2, and 0.80 ml in the battery in Example 2. Thus, it has been found that large terephthalic acid particles having an average particle diameter of 100 μm improve discharge performance and safety, but do not have an anti-corrosion effect.

Examples 5 to 8

An alkaline dry battery was produced in the same manner as in Example 3, except that the amount of terephthalic acid (relative to 100 parts by mass of the negative electrode active material) was the value in Table 2 during production of the negative electrode, and evaluated.

Evaluation results are summarized in Table 2.

TABLE 2

| | Negative electrode | | Evaluation | |
| --- | --- | --- | --- | --- |
| | Average particle diameter of terephthalic Acid (μm) | Amount of terephthalic acid (parts by mass) | Percentage of batteries generating heat (%) | High-rate discharge performance (index) |
| Example 5 | 130 | 0.005 | 0 | 101 |
| Example 6 | 130 | 0.01 | 0 | 109 |
| Example 3 | 130 | 0.2 | 0 | 116 |
| Example 7 | 130 | 0.5 | 0 | 109 |
| Example 8 | 130 | 1.0 | 0 | 101 |

In Examples 3, 6, and 7, in which the amount of terephthalic acid was 0.01 to 0.5 parts by mass relative to 100 parts by mass of the negative electrode active material, there were no batteries generating heat. Furthermore, in Examples 3, 6, and 7, high-rate discharge performance was greatly improved by about 10% or more.

Examples 9 and 10

An alkaline dry battery was produced in the same manner as in Example 3, except that the amount of polyvinyl alcohol in the separator (the amount of polyvinyl alcohol fiber in the nonwoven fabric) is the value in Table 3 during production of the separator, and evaluated.

Evaluation results are summarized in Table 3.

TABLE 3

|  | Negative electrode | | | Evaluation | |
|---|---|---|---|---|---|
|  | Average particle diameter of terephthalic Acid (μm) | Amount of terephthalic acid (parts by mass) | Separator Amount of polyvinyl alcohol (mass %) | Percentage of batteries generating heat (%) | High-rate discharge performance (index) |
| Example 9 | 130 | 0.2 | 50 | 0 | 109 |
| Example 3 | 130 | 0.2 | 65 | 0 | 116 |
| Example 10 | 130 | 0.2 | 70 | 0 | 110 |

In Examples 3, 9, and 10, in which the amount of polyvinyl alcohol in the separator was 50 to 70 mass %, there were no batteries generating heat. In Examples 3, 9, and 10, high-rate discharge performance was greatly improved by about 10% or more.

Example 11

An alkaline dry battery was produced in the same manner as in Example 3, except that 0.1 parts by mass of KF was added relative to 100 parts by mass of the negative electrode active material during production of the negative electrode, and evaluated.

Examples 12 to 14

An alkaline dry battery was produced in the same manner as in Example 3, except that 0.1, 0.5, or 1.0 parts by mass of KBr was added relative to 100 parts by mass of the negative electrode active material during production of the negative electrode, and evaluated.

Evaluation results are summarized in Table 4.

TABLE 4

|  | Negative electrode | | | | Evaluation | |
|---|---|---|---|---|---|---|
|  | Average particle diameter of terephthalic acid (μm) | Amount of terephthalic acid (parts by mass) | Co-additive | Amount of co-additive (parts by mass) | Percentage of batteries generating heat (%) | High-rate discharge performance (index) |
| Example 3 | 130 | 0.2 | — | — | 0 | 116 |
| Example 11 | 130 | 0.2 | KF | 0.1 | 0 | 121 |
| Example 12 | 130 | 0.2 | KBr | 0.1 | 0 | 122 |
| Example 13 | 130 | 0.2 | KBr | 0.5 | 0 | 123 |
| Example 14 | 130 | 0.2 | KBr | 1.0 | 0 | 116 |

In Examples 11 to 14, there were no batteries generating heat, and high-rate discharge performance was improved. In particular, in Examples 11 to 13, high-rate discharge performance was greatly improved by about 20% or more.

INDUSTRIAL APPLICABILITY

According to an embodiment of the present invention, the battery can be used in various devices using dry batteries as a power source. Suitable examples of the device include portable audio devices, electronic games, lights, and toys.

REFERENCE SIGNS LIST 1 battery case
2 positive electrode
3 negative electrode
4 closed-end cylindrical separator
4a cylindrical separator
4b bottom insulator
5 gasket
6 negative electrode current collector
7 negative electrode terminal plate
8 outer label
9 sealing unit

The invention claimed is:

1. An alkaline dry battery comprising:
a positive electrode;
a gel negative electrode;
a separator disposed between the positive electrode and the negative electrode; and
an alkaline electrolyte solution contained in the positive electrode, the negative electrode, and the separator,
wherein the negative electrode contains a negative electrode active material containing zinc and particulate terephthalic acid, and
the terephthalic acid has an average particle diameter of 25 to 210 μm.

2. The alkaline dry battery according to claim 1, wherein an amount of the terephthalic acid in the negative electrode is 0.01 to 0.5 parts by mass relative to 100 parts by mass of the negative electrode active material.

3. The alkaline dry battery according to claim 1, wherein the terephthalic acid has an average particle diameter of 100 to 210 μm.

4. The alkaline dry battery according to claim 1, wherein the separator contains 50 to 70 mass % of polyvinyl alcohol.

5. The alkaline dry battery according to claim 1, wherein the negative electrode contains 0.1 to 1.0 parts by mass of a potassium halide relative to 100 parts by mass of the negative electrode active material.

* * * * *